United States Patent [19]

Hasegawa et al.

[11] Patent Number: 4,978,191
[45] Date of Patent: Dec. 18, 1990

[54] CONNECTOR DEVICE

[75] Inventors: Masahiro Hasegawa; Seiichi Ueno, both of Kameyama, Japan

[73] Assignee: The Furukawa Electric Co., Ltd., Tokyo, Japan

[21] Appl. No.: 477,302

[22] Filed: Feb. 8, 1990

[30] Foreign Application Priority Data

Feb. 14, 1989 [JP] Japan ................................ 1-34560

[51] Int. Cl.⁵ ...................... G02B 6/36; H01R 39/02; H01R 35/00
[52] U.S. Cl. ................................. 350/96.20; 439/15; 439/164; 187/81; 188/2 R; 81/3.33; 350/96.10
[58] Field of Search ............... 350/96.10, 96.15, 96.20, 350/96.21, 96.29; 336/15; 174/21 JC, 21 JR, 86, 69; 439/13, 18, 22, 24, 25, 26, 27, 15, 164; 318/1, 7, 10; 187/78, 81, 82; 188/2 R, 4 B; 81/3.33, 53.12

[56] References Cited

U.S. PATENT DOCUMENTS

| | | | |
|---|---|---|---|
| 3,001,034 | 9/1961 | Aitken | 439/13 |
| 3,597,721 | 8/1971 | Mangan | 439/164 |
| 3,763,455 | 10/1973 | Confer et al. | 439/15 |
| 4,744,763 | 5/1988 | Suzuki et al. | 439/15 |
| 4,836,795 | 6/1989 | Schauer | 439/15 |

FOREIGN PATENT DOCUMENTS 0518098 2/1940 United Kingdom ................ 439/164

Primary Examiner—Akm Ullah
Attorney, Agent, or Firm—Frishauf, Holtz, Goodman & Woodward

[57] ABSTRACT

A connector device in which at least one flexible transmission member is housed in a holding portion, which is defined by a fixed housing mounted on a stationary member and a movable housing mounted on a rotating member and rotatably combined with the fixed housing, and the stationary and rotating members are connected by means a transmission member. The flexible transmission member is coiled in a spiral pile around the axis of rotation of the two housings, turned back in the middle thereof, and coiled in a spiral pile in the opposite direction from a U-turn portion at which the transmission member is turned back. By doing this, the transmission member can be reduced in length. Preferably, a spacer, which serves to guide the transmission member along at least the inside face of the U-turn portion, is interposed between those layers of the transmission member between which the U-turn portion is sandwiched, whereby the facing layers of the coiled transmission member can be prevented from sagging and coming into sliding contact with each other.

20 Claims, 13 Drawing Sheets

CONNECTOR DEVICE

BACKGROUND OF THE INVENTION

The present invention relates to a connector device for a transmission path connecting two members relatively rotating at a limited rotational frequency.

Disclosed in U.S. Pat. No. 4,744,763 is a "Connecting Device for a Transmission Line Connecting Two Relatively Rotating Members," in which the transmission line transmits electrical signals or electric power between a rotating member and a stationary member relatively rotating within a limited rotational frequency.

As shown in FIGS. 1 and 2, this conventional connector device comprises a movable housing 10 having a flange portion 1a and mounted on a rotating member, a fixed housing 2 having a flange portion 2a and mounted on a stationary member, a belt-shaped transmission line 3 coiled in a convolution having a plurality of turns around a rotating shaft of the rotating member, and a vibration restraining member 4 interposed between the transmission line 3 and the flange portion 1a or 2a. The transmission line 3 is coiled and loosely housed in a holding portion 5 which is defined by the two housings 1 and 2. The inner and outer coil end portions of the transmission line 3 are fixed to the movable housing 1 and the fixed housing 2, respectively. As the transmission line 3 is tightened or loosened, the movable housing 1 can rotate relatively to the fixed housing 2, for a plurality of turns in an alternating manner. The vibration restraining member 4 restrains the transmission line 3 from vibrating, thereby preventing production of noises.

The connector device of this type may, for example, be used in an airbag apparatus, which is stored in the central portion of a steering wheel of a car steering system, and is adapted to inflate, thereby preventing a driver from bumping against the front portion of the interior appointments, in case of a car crash. The inner coil end portion of the transmission line 3 stored in the holding portion 5 is connected to a lead wire which extends from a starter of the airbag apparatus, while the outer coil end portion of the line 3 is connected to a lead wire which extends to a crash sensor attached to the car front. A start signal from the crash sensor, which serves to start the airbag apparatus, is transmitted by means of the transmission line 3.

In the connector device of this type, unlike a connector device of the slip-ring type, there is no instantaneous disconnection of contacts. In other words, apparatuses on the sides of the rotating and stationary members are always connected electrically with each other without regard to the rotation of the housings 1 and 2, as long as the housings 1 and 2 can rotate relatively. With use of the connector device of the slip-ring type, a short circuit may be caused by metal powder which is produced by a slip ring and a brush in sliding contact with each other, or the apparatuses may undergo wrong operation due to noise signals attributable to the instantaneous disconnection of the sliding contact portions. The connector device of the aforementioned type, however, is free of such awkward situations, thus ensuring formation of a highly reliable transmission path.

In the connector device, the transmission line 3 is loosely housed in the holding portion 5 so that it can tighten or loosen, in order to secure a predetermined rotational frequency of the rotating member relative to the stationary member. Therefore, the transmission line 3 must be longer than a length which is determined by the circumferential length of the holding portion 5 and the rotational frequency of the movable housing 1. Further, the transmission line 3 should be a flexible, seamless integral product which can be smoothly tightened or loosened. In the existing circumstances, therefore, the manufacturing cost is high. Thus, the connector device using the volute transmission line 3 is expensive due to the length of the transmission line.

If the transmission line 3 is lengthened, the whole device is increased in size and weight. Therefore, the operation of the connector device requires a greater torque and produces higher noises. Thus, the connector device cannot enjoy smooth and silent operation.

If the torque increases, moreover, the transmission line 3 is subjected to a greater stress, so that it is liable to be buckled. Once the buckling occurs, it grows into a habit with the transmission line 3. After prolonged use, therefore, buckled portions may become fatigued, thus entailing disconnection.

OBJECTS AND SUMMARY OF THE INVENTION

An object of the present invention is to provide a connector device for a transmission path line connecting two relatively rotating members, the connector device being reliable and safe and permitting reduction of the length of a transmission member.

Another object of the invention is to provide a low-priced connector device.

Still another object of the invention is to provide a connector device permitting reduction in size and weight and capable of low-noise operation.

A further object of the invention is to provide a connector device capable of smooth tightening and loosening of a transmission member and resisting prolonged use.

In order to achieve the above objects, a connector device according to the present invention comprises a first housing mounted on a stationary member and a second housing mounted on a rotating member, at least one of the housings having a rotating shaft, and at least one flexible transmission member having one end fixed to the first housing and the other end fixed to the second housing, and housed in a holding portion defined by the two housings, the two housings being capable of relatively rotating for a plurality of turns around the rotating shaft. In this connector device, the transmission member is coiled in a spiral pile around the axis of rotation of the two housings, turned back in the middle thereof, and coiled in a spiral pile in the opposite direction from a U-turn portion at which the transmission member is turned back.

Preferably, a spacer may be disposed inside the U-turn portion at which the transmission member is turned back.

Preferably, moreover, a plurality of transmission members may be coiled in layers so that the respective U-turn portions of the transmission members are arranged at predetermined intervals in the circumferential direction.

The connector device of the present invention may be applied to a transmission member which transmits an electrical signal, optical signal, electric power, working fluid, etc., by connecting the stationary and rotating members which include portions relatively rotating at a limited rotational frequency, in an elevator, crane, machine tool, robot, etc., as well as in the aforementioned car steering system. If the two housings are provided individually with engaging means which engage each other, thereby enabling the housings to rotate relatively without being separated from each other, the housings can be used in a tilted or fallen state.

The above and other objects, features, and advantages of the invention will be more apparent from the ensuing detailed description taken in connection with the accompanying drawings.

DETAILED DESCRIPTION

Referring now to FIGS. 3 to 9, there will be described a connector device according to a first embodiment of the present invention, which is applied to a brushless electrical signal transmission system.

Figure 1:
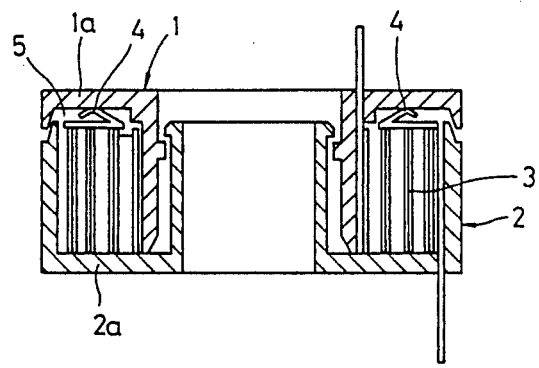
FIG. 1 is a longitudinal sectional view of a prior art connector device.
Figure 2:
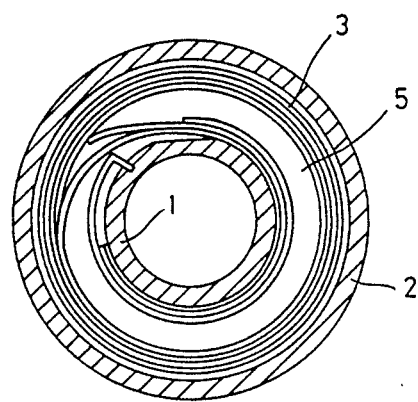
FIG. 2 is a cross-sectional view of the prior art connector device.
Figure 3:
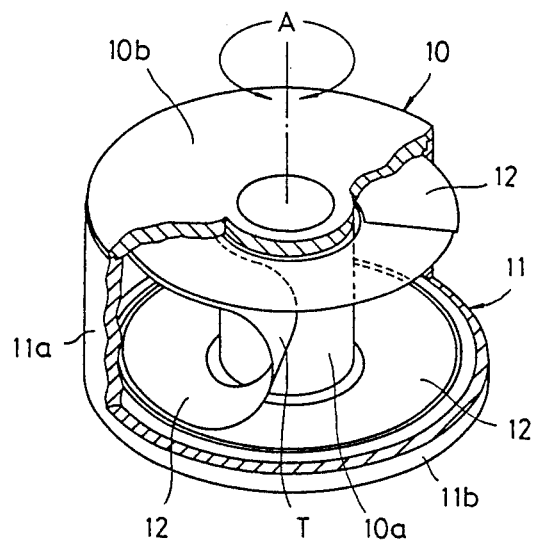
FIG. 3 is a cutaway perspective view of a connector device according to a first embodiment of the present invention.

As shown in FIG. 3, the connector device comprises a movable housing 10, a fixed housing 11, and a flexible flat cable 12 contained in the housings 10 and 11.

Figure 4:
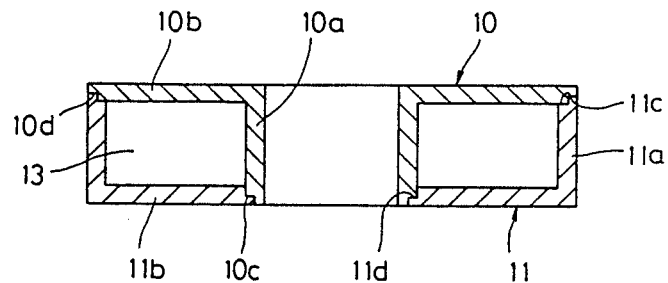
FIG. 4 is a sectional front view of a housing of the connector device shown in FIG. 3.

The movable housing 10 is mounted on a rotating member (not shown). In the movable housing 10, as shown in FIG. 4, an inner cylinder shaft portion 10a, for use as a rotating shaft, and an upper flange 10b, which extends radially outward from the upper end of the shaft portion 10a, are formed integrally with each other. Stepped portions 10c, and 10d, which are rotatably engaged with the fixed housing 11, are formed on the lower end of the inner cylinder shaft portion 10a and the outer edge of the upper flange 10b, respectively.

On the other hand, the fixed housing 11 is mounted on a stationary member (not shown). In the fixed housing 11, an outer cylinder shaft portion 11a coaxial with the inner cylinder shaft portion 10a and a lower flange 11b, which extends radially inward from the lower end of the shaft portion 11a, are formed integrally with each other. Stepped portions 11c an 11d, which are engaged with the stepped portions 10c and 10d, respectively, of the movable housing 10, are formed on the upper end of the outer cylinder shaft portion 11a and the inner edge of the lower flange 11b, respectively. When the housings 10 and 11 are engaged with each other, a holding portion 13, in the form of an annular space, for holding the flat cable 12 is defined, and the movable housing 10 is allowed to rotate relative to the fixed housing.

Figure 5:
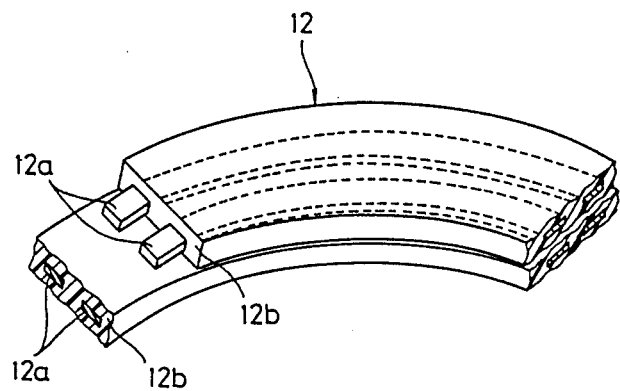
FIG. 5 is a perspective view of a flat cable used in the connector device shown in FIGS. 3, the cable including conductors with a square cross section.
Figure 6:
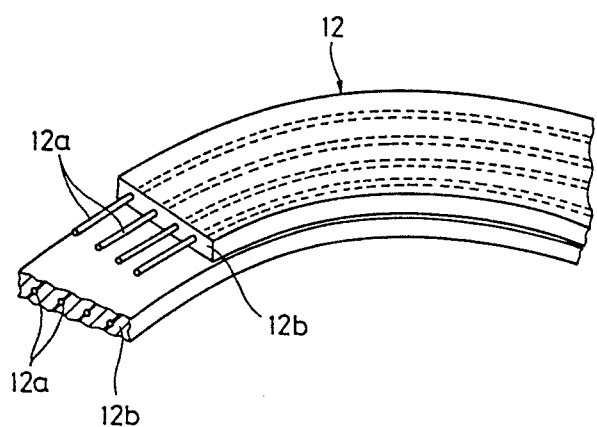
FIG. 6 is a perspective view of a flat cable including conductors with a circular cross section.
Figure 7:
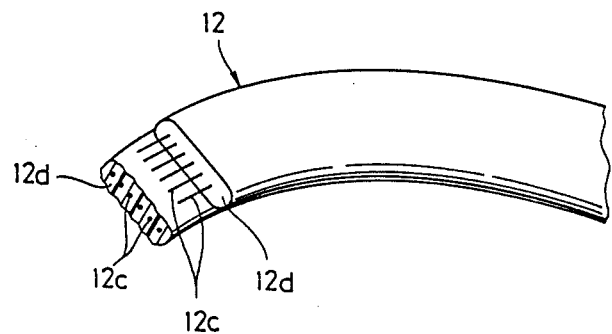
FIG. 7 is a perspective view of a flat cable composed of a plurality of optical fibers.

The flat cable 12, whose cross section is flat, may be an electric wire for transmitting electrical signals or electric power or a light transmission line for transmitting optical signals. Preferably, the cable 12 may be formed of a plurality of parallel conductors 12a, having a square or circular cross section, and an insulating coating 12b covering the conductors, as shown in FIGS. 5 and 6. The cable 12 may alternatively be a tape fiber which is formed of a plurality of optical fibers 12c for transmitting optical signals and a coating 12d covering the fibers. Alternatively, moreover, the flat cable 12 may be a combination of the electric wire and the light transmission line.

Figure 8:
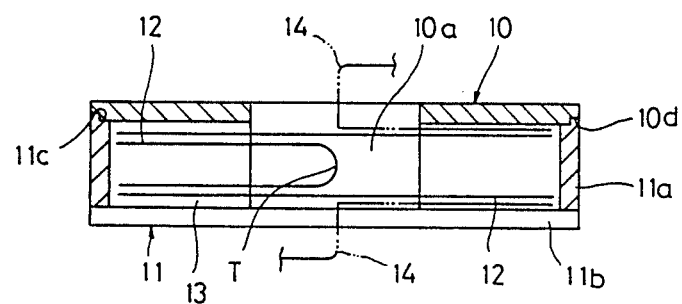
FIG. 8 is a longitudinal sectional view of the connector device shown in FIG. 3.

The flat cable 12 is integrally formed into a spiral such that flat faces of its layered turns overlap one another on concentric circles and the overlapping layers have equal outside and inside diameters when the cable 12 is housed in the holding portion 13. As shown in FIG. 3, the flat cable 12 in the holding portion 13 is coiled in a spiral pile around the axis of rotation of the housings 10 and 11, turned back in the middle thereof, and coiled in a spiral pile in the opposite direction from its U-turn portion T. The upper and lower ends of the flat cable 12 are fixed to the movable housing 10 and the fixed housing 11, respectively. Thus, the two housings 10 and 11 can relatively rotate for a predetermined number of turns, as indicated by arrow A in FIG. 3. As shown in FIG. 8, moreover, a lead wire 14 is connected to each fixed end of the flat cable 12. These lead wires 14 are drawn out from through holes (not shown) bored through the housings 10 and 11, and are connected to predetermined apparatuses, individually.

When the movable housing 10, in the connector device constructed in this manner, rotates in the counterclockwise direction of FIG. 3, for example, the flat cable 12 is paid out from the side of the upper flange 10b toward the lower flange 11b. As the flat cable 12 is paid out in this manner, the U-turn portion T of the flat cable 12 moves in the counterclockwise direction in the holding portion 13, at a speed half the rotating speed of the movable housing 10, that is, at half the angular speed of the movable housing 10. While the movable housing 10 makes one round, therefore, the U-turn portion T moves half round in the circumferential direction in the housing 13. Accordingly, the movable housing 10 can rotate relatively to the fixed housing 11, for an angular distance twice the length of the flat cable 12, that is, for the distance equivalent to two turns of the cable 12.

Thus, the flat cable 12 can be made much shorter than a volute flat cable, so that the price of the connector device can be lowered. Since the flat cable 12 is shortened, the space occupied by the cable 12 in the holding portion 13 is reduced. Thus, the size of the connector device can be reduced, or the electric resistance can be restrained by increasing the cross-sectional area of the conductors 12a. Since the flat cable 12 is shortened, moreover, the connector device can be operated with a small torque, and the cable 12 is subjected to only a small stress, so that the operation noise level is low. Furthermore, the flat cable 12 causes the relative rotation of the two housings not through its tightening or loosening action, but through the movement of its U-turn portion T, so that buckling can be effectively restrained, owing also to the small stress acting on the cable 12. Thus, the reliability of the connector device can be maintained for a long period of time, that is, the lifetime of the device can be lengthened.

Figure 9:
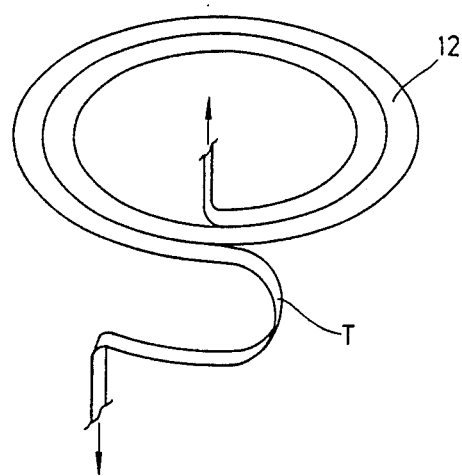
FIG. 9 is a perspective view showing a volute flat cable.

The flat cable 12 may be of any other shapes than the aforesaid one, provided it can be housed in the holding portion 13, and the U-turn portion T can smoothly move in the circumferential direction without causing the lateral side portions of the cable 12 to interfere with the inner cylinder shaft portion 10a or the inner wall surface of the outer cylinder portion 11a. As shown in FIG. 9, for example, the flat cable 12 may be in the form of a convolution in which a plurality of concentric turns are arranged in the radial direction on one and the same plane so that the outside and inside diameters of the turns increase continuously. With this configuration, the transmission member can be easily manufactured at low cost by stamping it out from an electrically conductive metal sheet.

Figure 10:
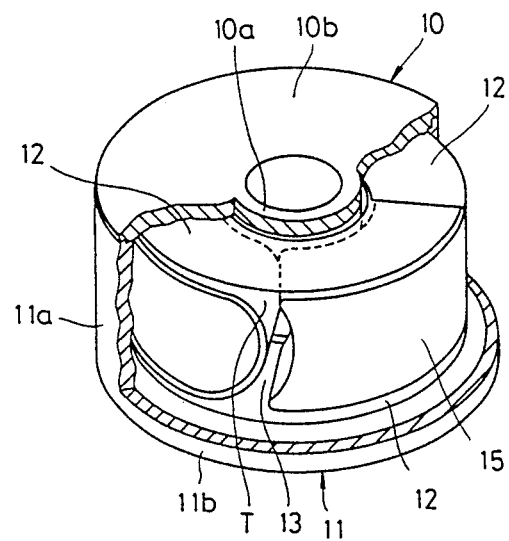
FIG. 10 is a cutaway perspective view of a connector device according to a second embodiment of the present invention, in which a spacer is interposed between those layers of a flat cable between which a U-turn portion is sandwiched.
Figure 11:
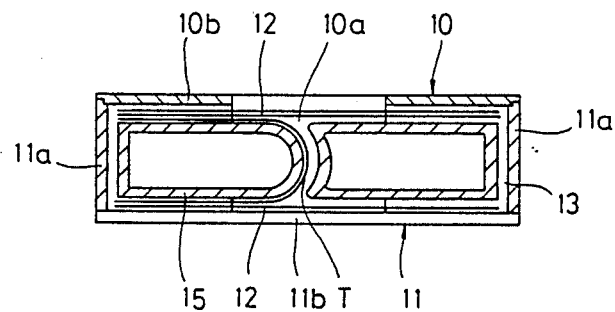
FIG. 11 is a longitudinal sectional view of the connector device shown in FIG. 10.

Referring now to FIGS. 10 and 11, a connector device according to a second embodiment of the present invention will be described. In this embodiment, a spacer, formed of e.g. a plastic material, is interposed between those layers of a flat cable 12 between which a U-turn portion T is sandwiched. In the following drawings which show various embodiments to follow, like reference numerals are used to designate like components having substantially the same construction and functions as those of the first embodiment. Detailed description of these components is omitted herein.

In the connector device of the second embodiment, the spacer 15, which moves together with the U-turn portion T in the circumferential direction in a holding portion 13 defined by two housings 10 and 11, is disposed facing the inside face of the U-turn portion T of the flat cable 12. The spacer 15, which serves to guide the flat cable 12, is a C-ring-shaped member extending throughout the holding portion 13 in the circumferential direction, from the inside face of the U-turn portion T of the flat cable 12 to the outside face thereof. The opposite end faces of the spacer 15, which face the inside and outside faces of the U-turn portion T, individually, are curved surfaces which correspond to the curvature of the U-turn portion T.

By interposing the spacer 15 between the layers on either side of the U-turn portion T of the flat cable 12, the cable 12 can be prevented from sagging on the opposite side of the inner cylinder shaft portion 10a to the U-turn portion T, in the holding portion 13. Thus, the flat cable 12 can be prevented from being buckled by friction between its sagging layers during the operation of the connector device.

Figure 12:
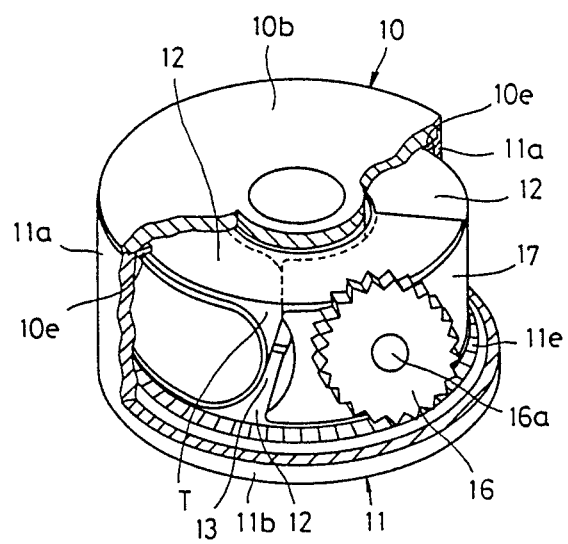
FIG. 12 is a cutaway perspective view of a connector device, showing a modification of the spacer, which is forced to move by drive means.
Figure 13:
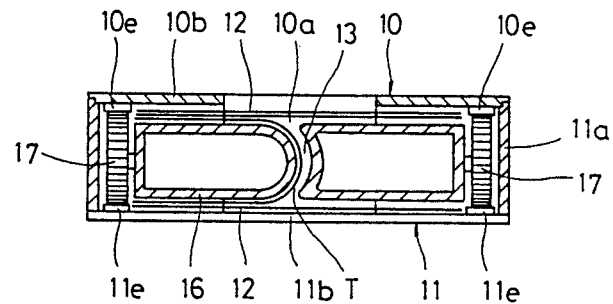
FIG. 13 is a longitudinal sectional view of the connector device shown in FIG. 12.
Figure 14:
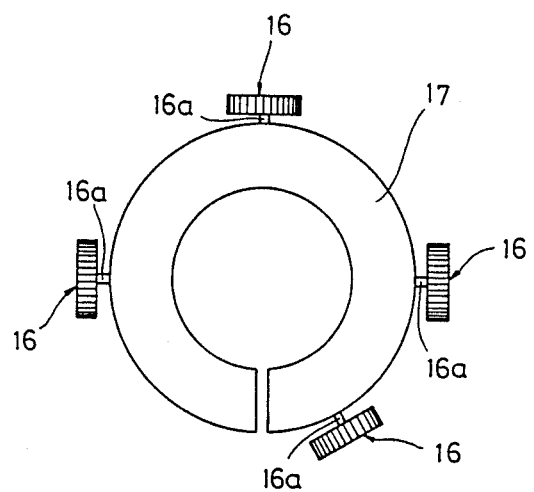
FIG. 14 is a plan view of the spacer shown in FIG. 12.

FIGS. 12 to 14 show a modification of the spacer, in which drive means is provided for moving the spacer in the circumferential direction in association with the relative rotation of the housing 10 and 11. The connector device is additionally provided with four gears 16 and face gears 10e and 11e in mesh therewith. The gears 16, which are rotatably supported by means of a pin 16a each, are arranged at regular intervals outside the spacer 17. The face gears 10e and 11e are formed extending in the circumferential direction on the outer peripheral portion of the lower surface of the upper flange 10b and the outer peripheral portion of the upper surface of the lower flange 11b, respectively, in the holding portion 13.

When the movable housing 10 rotates, in this arrangement, the gears 16 in mesh with the face gears 10e and 11e rotate in association with the movable housing 10, and the spacer 17 is moved in the circumferential direction at half the speed of relative rotation of the housings 10 and 11. Accordingly, the flat cable 12 is paid out at a constant speed so that the moving speeds of the spacer 17 and the U-turn portion T are equal. Thus, the U-turn portion T can be smoothly moved in the holding portion 13. The four gears 16 are arranged at regular intervals outside the spacer 17 in the present embodiment, they need not always be arranged at regular intervals, and at least one gear 16 is essential.

Figure 15:
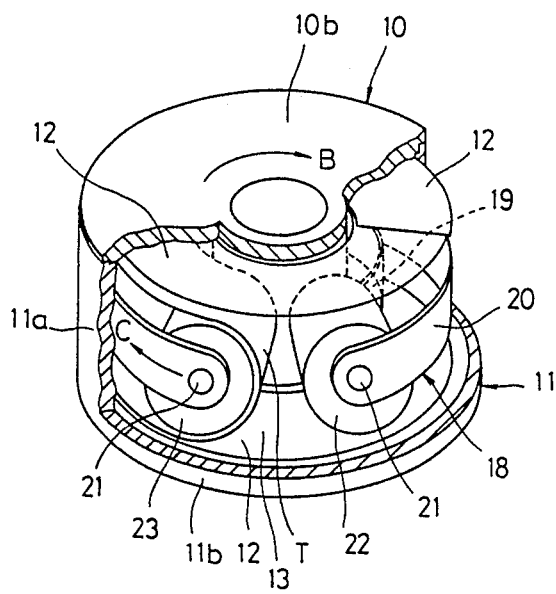
FIG. 15 is a cutaway perspective view of a connector device, showing another modification of the spacer.
Figure 16:
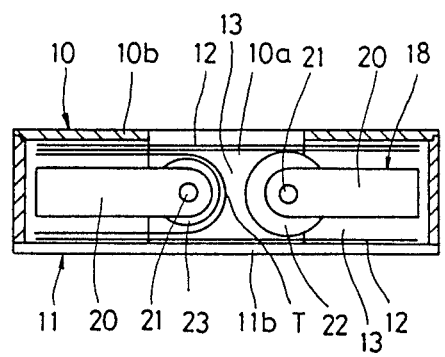
FIG. 16 is a longitudinal sectional view of the connector device shown in FIG. 15.

FIGS. 15 and 16 show another modification of the spacer. In this case, the connector device is provided with a C-ring-shaped spacer 18 with rollers, extending from the inside face of the U-turn portion T of the flat cable 12 to the outside face thereof.

The spacer 18 includes retaining arms 19 and 20 arranged on the inner and outer peripheral sides, respectively, of the holding portion 13, and rollers 22 and 23 rotatably supported on the opposite ends of the arms 19 and 20, respectively, by means of pins 21. With use of the spacer 18, when the U-turn portion T moves, the rollers 22 and 23 of the spacer 18 is forced to roll by the flat cable 12, thereby preventing the cable 12 from sagging or buckling. Also, the spacer 18 in the holding portion 13 moves quickly, so that the speed of supply of the flat cable 12, which accompanies the rotation of the movable housing 10, is stabilized, so that the U-turn portion T can be moved smoothly.

When the movable housing 10 rotates in the direction of arrow B of FIG. 15, for example, the flat cable 12 is paid out from the side of the lower flange 11b toward the upper flange 10b. As the cable 12 is paid out in this manner, the U-turn portion T moves in the direction of arrow B in the holding portion 13. As the U-turn portion T moves in this manner, the rollers 22 and 23 roll on the flat cable 12, so that the spacer 18 moves quickly and smoothly in the direction of arrow C.

Figure 17:
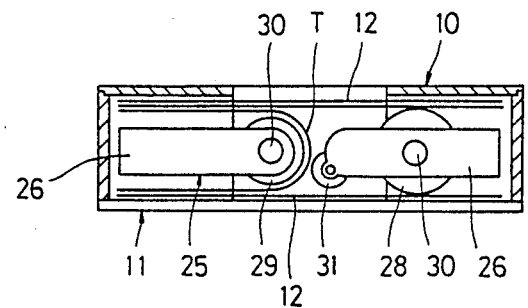
FIG. 17 is a cutaway perspective view of a connector device, showing still another modification of the spacer.

FIG. 17 shows still another modification of the spacer. In this spacer 25, rollers 28 and 29 are rotatably supported on one end portion and the other end, respectively, of each of C-ring-shaped retaining arms 26 and 27 (arm 27 is not shown) by means of pins 30, and an auxiliary roller 31 is mounted on the one end of each arm. The auxiliary roller 31 is attached to those end portions of the retaining arms 26 and 27 on the side of the roller 28 so as to face the outside face of the U-turn portion T without coming into sliding contact with the top or bottom portion of the flat cable 12.

The use of the spacer 25 with the auxiliary roller 31 provides the following advantage. As the spacer 25 moves accompanying the rotation of the movable housing 10, the rollers 28 and 29 rotate in different directions. If the retaining arms 26 and 27 bend and contract in the circumferential direction, therefore, the auxiliary roller 31 engages the outside face of the U-turn portion T, and the roller 29 rotates in a direction such that the flat cable 12 is paid out. Thus, the rollers 28 and 29, which rotate in the different directions, never engage each other through the U-turn portion T, so that the flat cable 12 can be smoothly paid out without preventing the U-turn portion T from moving in the circumferential direction.

Figure 18:
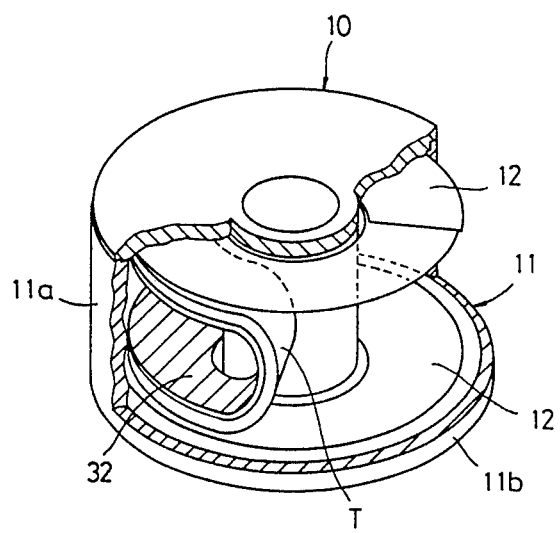
FIG. 18 is a cutaway perspective view of a connector device using a spacer in the form of a annular disk.
Figure 19:
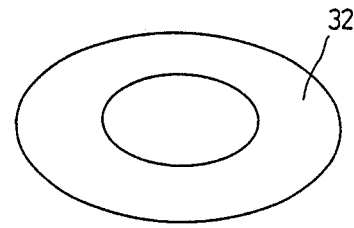
FIG. 19 is a perspective view of the spacer of FIG. 18 in an unfolded state.
Figure 20:
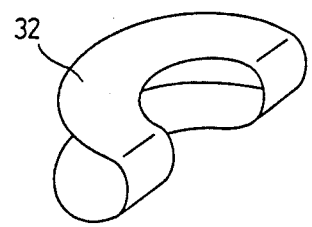
FIG. 20 is a perspective view of the spacer of FIG. 19 doubled along its diameter.
Figure 21:
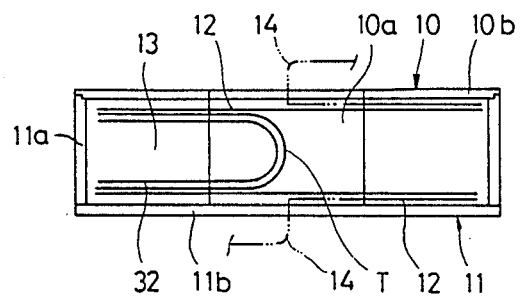
FIG. 21 is a longitudinal sectional view of the connector device shown in FIG. 18.

FIGS. 18 to 21 show a further modification of the spacer. As shown in FIG. 19, this spacer 32 is in the form of an annular disk. It is formed of synthetic resin, such as PET (polyethylene terephthalate), nylon, etc., or metal, such as aluminium, which is flexible and has a low frictional resistance to the flat cable 12. The spacer 32 is doubled along its diameter, as shown in FIG. 20, and is interposed between those layers of the flat cable 12 between which the U-turn portion T is sandwiched, as shown in FIGS. 18 and 21.

With use of the spacer 32 constructed in this manner, the flat cable 12 in the holding portion 13 can be easily prevented from sagging. Also, the spacer 32 is light in weight, and the friction between the spacer 32 and the cable 12 is small, so that the U-turn portion T can be moved smoothly and quietly. Moreover, the spacer 32 is low-priced because it can be easily manufactured from a sheet of synthetic resin or metal by pressing or the like, moreover.

Figure 22:
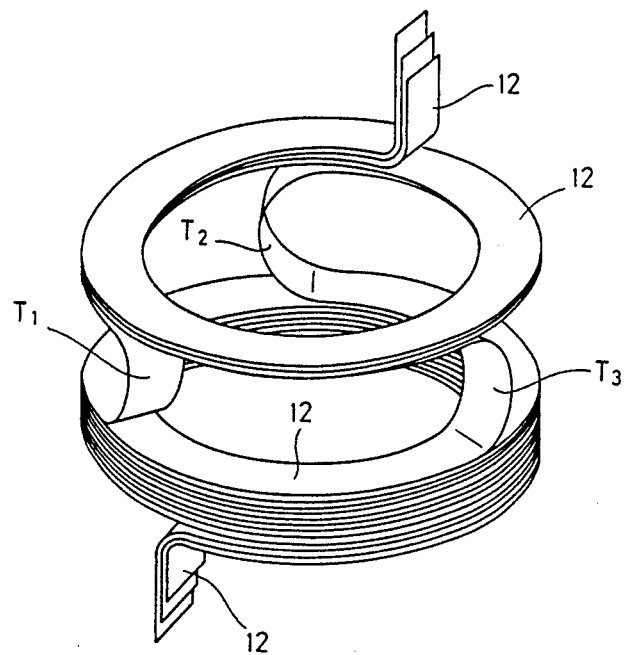
FIG. 22 is a perspective view showing a plurality of coiled transmission members used in a connector device according to a third embodiment of the present invention.

Referring now to FIG. 22, there will be described a connector device according to a third embodiment of the present invention, in which three flat cables 12 are coiled in layers.

In the connector device of the third embodiment, the three integral flat cables 12, which can be coiled in spiral layers on concentric circles so that the individual coiled layers are equal in outside and inside diameters, are housed in a holding portion 13 in a manner such that the cables 12 are coiled in a spiral pile around the axis of rotation of the housings 10 and 11. The flat cables 12 individually have U-turn portions T1, T2 and T3 at which they are turned back in the middle, as illustrated. These U-turn portions are arranged at regular intervals in the circumferential direction.

According to the connector device constructed in this manner, the flat cables 12 in the holding portion 13 can be prevented from sagging by means of the three U-turn portions T1, T2, and T3, without using any spacer. Accordingly, the flat cables 12 can never be in sliding contact with one another, so that they are free from buckling. Thus, the reliability of the connector device can be maintained for a long period of time, that is, the lifetime of the device can be lengthened.

Referring now to FIGS. 23 to 26, there will be described a connector device according to a fourth embodiment of the present invention, which uses two flexible round cables with a circular cross section.

The connector device of the fourth embodiment comprises a movable housing 40, a fixed housing 41, and two flexible electric wires 42 contained in the housings 40 and 41.

Figure 23:
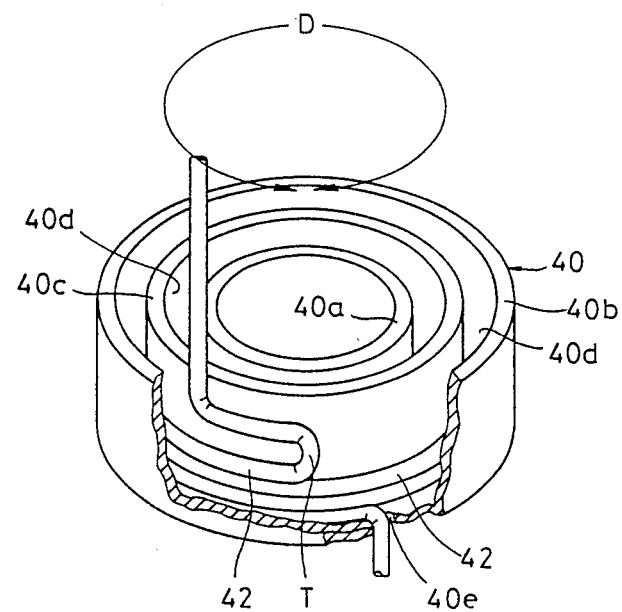
FIG. 23 is a cut away perspective view showing a movable housing of the connector device according to a fourth embodiment of the present invention.

The movable housing 40 is mounted on a rotating member (not shown). In the movable housing 40, as shown in FIG. 23, a circumferential partition wall 40c is formed between an inner cylinder shaft portion 40a, for use as a rotating shaft, and an outer cylinder portion 40b, so as to be coaxial therewith. Thus, two holding grooves 40d are formed which serve as holding portions to contain the electric wires 42. The movable housing 40 rotates in the direction of arrow D around the inner cylinder shaft portion 40a.

Figure 24:
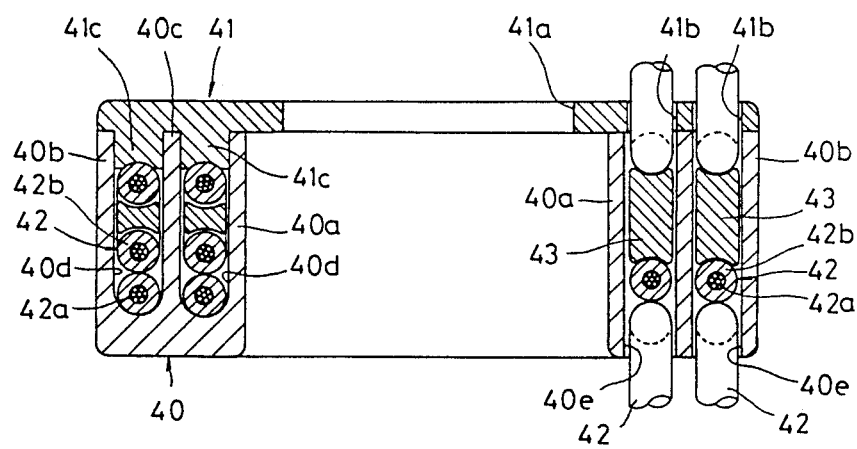
FIG. 24 is a sectional front view of the connector device according to the fourth embodiment.
Figure 25:
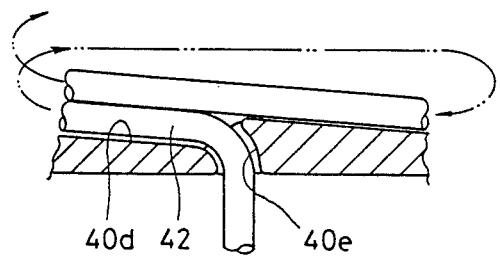
FIG. 25 is a partial sectional front view showing the relationship between a through hole of a movable housing and an electric wire.

A through hole 40e is bored through the bottom wall of each holding groove 40d. Each electric wire 42 is led into the movable housing 40 through the hole 40e. The respective through holes 40e of the two holding grooves 40d adjoin each other with the partition wall 40c between them. As shown in FIGS. 24 and 25, moreover, the bottom face of each groove 40d is a slanting surface which ascends in the circumferential direction from its corresponding through hole 40e, and at the same time, is a concave surface which corresponds to the external shape of the electric wire 42. Thus, the holding grooves 40d serve to guide the coiled wires 42 in the circumferential direction. As shown in FIG. 25, moreover, the inner surface of each through hole 40e curvedly ascends to the holding groove 40d lest the electric wire 42 led into the movable housing 40 be subjected to an excessive bending stress.

The fixed housing 41 is rotatably fitted on the top of the movable housing 40, and is mounted a stationary member (not shown). As shown in FIG. 24, the fixed housing 41 is a disk-shaped member having a center hole 41a through which the stationary member is passed. Two through holes 41b, through which the electric wires 42 are to be led out, are bored through the outer peripheral portion of the fixed housing 41, corresponding to the through holes 40e of the movable housing 40. Two ridges 41c, which are adapted to be fitted individually in the holding grooves 40d, protrude from the underside of the fixed housing 41.

The ridges 41c, like the holding grooves 40d, serve to guide the electric wires 42 to be coiled on the side of the fixed housing 41. Each ridge 41c has a slanting surface which inclines in the circumferential direction from its corresponding through hole 41b.

As shown in FIG. 24, each electric wire 42 is a round multicore cable with a circular cross section which is composed of a plurality of stranded conductors 42a and an insulating coating 42b covering the conductors 42a. Each wire 42 is led into the movable housing 40 through its corresponding through hole 42e, guided by the bottom face of its corresponding holding groove

40*d*, to be coiled in a spiral therein, and turned back in the middle. A C-ring-shaped spacer 43 is disposed inside a U-turn portion T at which the wire 42 is turned back. The electric wire 42, turned back along the spacer 43, is guided along the ridge 41*c* of the fixed housing 41 to the through hole 41*b*, and is drawn out through the hole 41*b*. The individual electric wires 42, drawn out from the housings 40 and 41, are connected to their corresponding predetermined. apparatuses.

Figure 26:
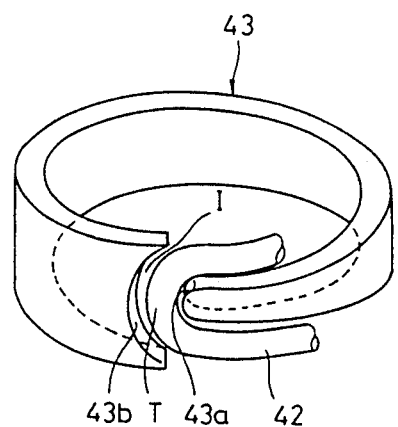
FIG. 26 is a perspective view showing the relationship between a spacer and the electric wire turned back along the same.

As shown in FIG. 26, the spacer 43 is in the form of a C-ring-shaped wedge, which extends in the circumferential direction, from the inside face of the U-turn portion T of each electric wire 42 toward the outside face thereof, so as to correspond to the coil pitch of the wire 42. A gap I with a predetermined width is defined between end faces 43*a* and 43*b* of the spacer 43, which are opposed to the inside and outside faces, respectively, of the U-turn portion T, so that the electric wire 42 can be turned back in the gap I. End faces 43*a* and 43*b* are convex and concave, respectively, with respect to the circumferential direction. Those portions of the end faces 43*a* and 43*b* which are in contact with the surface of the electric wire 42 are concave surfaces which correspond to the external shape of the wire 42.

When the movable housing 40, in the connector device constructed in this manner, rotates in the clockwise direction of FIG. 23, for example, the two electric wires 42 are paid out individually from the side of the holding grooves 40*d* toward the ridges 41*c*, and the U-turn portions T move in the clockwise direction in the holding grooves 40*d*, at a speed half the rotating speed of the movable housing 40. While the movable housing 40 makes one round, therefore, the U-turn portions T move half round in the circumferential direction in the holding grooves 40*d*. Accordingly, the movable housing 40 can rotate relatively to the fixed housing 41, for a number of turns equivalent to twice the length of each electric wire 42. For a required number of turns, therefore, the wire 42 can be made shorter than a volute electric wire, so that the electric resistance can be lowered.

Since each electric wire 42 is turned back in the middle to be coiled in the opposite direction, the U-turn portion T can smoothly move in the circumferential direction in the holding groove 40*d* without causing buckling. Thus, the reliability of the connector device can be maintained for a long period of time.

Since the spacer 43 is held against the U-turn portion T of each flexible electric wire 42, moreover, the wire 42 can be prevented from sagging in the holding groove 40*d*. Accordingly, there is no possibility of friction being produced due to sliding contact between the turns of the coiled wire 42. Thus, the electric wire 42 can be prevented from being reversed and buckled. Since the spacer 43 is held against the U-turn portion T, furthermore, the wire 42 is restraining from moving uselessly, and no noises can be produced by vibration.

In the fourth embodiment, the round cable with a circular cross section is used in the connector device. It is to be understood, however, that a flat cable with a flat cross section may be also used with the same result.

What is claimed is:

1. A connector device comprising:
    a first housing mounted on a stationary member and a second housing mounted on a rotating member, at least one of said housings having a rotating shaft, said two housings being capable of relatively rotating for a plurality of turns around the rotating shaft; and
    at least one flexible transmission member having one end fixed to the first housing and the other end fixed to the second housing, and housed in a holding portion defined by the two housings,
    said transmission member being coiled in a spiral pile around the axis of rotation of the two housings, turned back in the middle thereof, and coiled in a spiral pile in the opposite direction from a U-turn portion at which the transmission member is turned back.

2. A connector device according to claim 1, wherein said transmission member is a flat cable in the form of a spiral capable of being coiled in a plurality of layers on concentric circles, said individual coiled layers being equal in outside and inside diameters.

3. A connector device according to claim 1, wherein said transmission member is a flat cable in the form of a convolution capable of being arranged having a plurality of concentric turns in the radial direction on one and the same plane, the outside and inside diameters of said individual turns increasing continuously.

4. A connector device according to claim 2, further comprising a spacer interposed between those layers of said transmission member between which the U-turn portion is sandwiched, said spacer serving to guide the transmission member along at least the inside face of the U-turn portion.

5. A connector device according to claim 4, wherein said spacer is in the form of a ring having one end face opposed to and extending along the inside face of the U-turn portion and the other end face opposed to and extending along the outside face of the U-turn portion.

6. A connector device according to claim 4, further comprising drive means disposed between the spacer and the first and second housings and adapted to move the spacer in the circumferential direction in association with the relative rotation of the first and second housings.

7. A connector device according to claim 6, wherein said drive means includes a gear rotatably mounted on the spacer and face gears formed facing the holding portion of the first and second housings and extending in the circumferential direction.

8. A connector device according to claim 4, wherein said spacer includes a set of ring-shaped retaining arms each having one and the other ends facing the inside and outside faces, respectively, of the U-turn portion, and rollers mounted individually on the opposite ends of the retaining arms.

9. A connector device according to claim 4, wherein said spacer includes a set of ring-shaped retaining arms each having one and the other ends facing the inside and outside faces, respectively, of the U-turn portion, rollers mounted individually on the first ends and the other end portions of the retaining arms, and an auxiliary roller mounted on the other ends of the retaining arms and adapted to guide the turned transmission member in cooperation with the roller on the first ends.

10. A connector device according to claim 4, wherein said spacer is formed of a flexible annular disk, said annular disk being doubled the diameter thereof and interposed between the layers between which the U-turn portion is sandwiched.

11. A connector device according to claim 1, wherein a plurality of transmission members are coiled in layers so that the respective U-turn portions of the transmission members are arranged at predetermined intervals in the circumferential direction.

12. A connector device according to claim 1, wherein said holding portion includes a plurality of coaxial spaces defined by a partition wall or walls formed on one of the first and second housings so as to be coaxial with the rotating shaft.

13. A connector device according to claim 12, wherein that wall surface of at least one of said first and second housings which faces the holding portion is formed with a circumferential slanting surface gradually penetrating into the holding portion and adapted to guide the transmission member to be coiled.

14. A connector device according to claim 1, wherein said transmission member is formed of a flat cable with a flat cross section.

15. A connector device according to claim 1, wherein said transmission member is formed of round cable with a circular cross section.

16. A connector device according to claim 12, wherein said transmission member is formed of round cable with a circular cross section.

17. A connector device according to claim 1, wherein said transmission member is formed of an electric wire for transmitting electrical signals or electric power.

18. A connector device according to claim 1, wherein said transmission member is formed of a light transmission line for transmitting optical signals.

19. A connector device according to claim 1, wherein said transmission member is a combination of an electric wire for transmitting electrical signals or electric power and a light transmission line for transmitting optical signals.

20. A connector device according to claim 12, wherein said transmission member is a round cable for transmitting electrical signals or electric power.

* * * * *